(No Model.)  2 Sheets—Sheet 1.

E. ARNOLD.
ELECTRIC MOTOR AND DYNAMO.

No. 562,366. Patented June 23, 1896.

Witnesses
Edward Thorpe

Inventor
Engelbert Arnold
By his Attorney (No Model.) 2 Sheets—Sheet 2.
E. ARNOLD.
ELECTRIC MOTOR AND DYNAMO.
No. 562,366. Patented June 23, 1896.
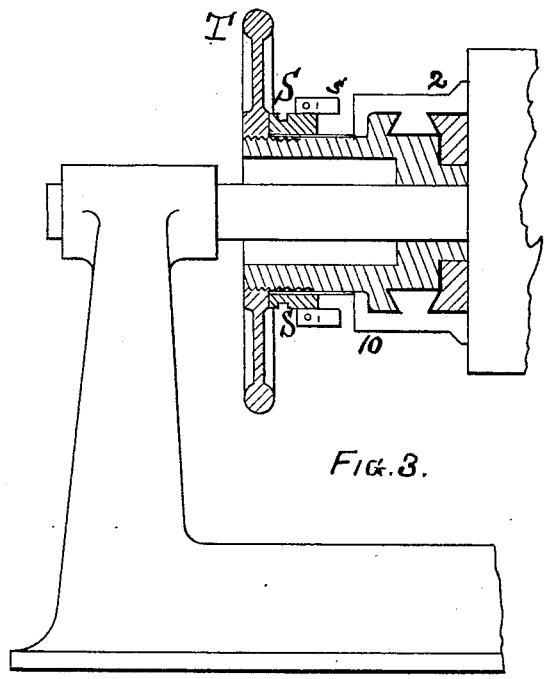
Witnesses
E. M. Meineke
George N. Sonneborn
Inventor.
Engelbert Arnold
by Harold Binney
Attorney.

UNITED STATES PATENT OFFICE.

ENGELBERT ARNOLD, OF CARLSRUHE, GERMANY.

ELECTRIC MOTOR AND DYNAMO.

SPECIFICATION forming part of Letters Patent No. 562,366, dated June 23, 1896.

Application filed April 5, 1895. Serial No. 544,534. (No model.)

*To all whom it may concern:*

Be it known that I, ENGELBERT ARNOLD, of Carlsruhe, Germany, and recently of Zurich, Switzerland, have invented a certain new and useful Improvement in Electric Motors and Dynamos, of which the following is a description, referring to the accompanying drawings, which form a part of this specification.

My invention relates particularly to the commutator connections of alternating-current machines, though in many respects it is applicable to other machines.

The purpose of the invention is to prevent sparking by suppressing the harmful short-circuit currents caused at the instant the commutator-brush is passing from one segment of the commutator to the next, for that instant connecting the segments together and allowing the corresponding coil of the armature to short-circuit. In alternating-current devices, especially in induction-motors, provided with commutators and brushes either for starting or operating, these instantaneous currents often cause so much sparking in many types of machine that the commercial value of large machines is destroyed. By my device no such harmful sparking can take place. Since the same causes operate to a less extent in constant-current machines, it follows my invention is also applicable to them.

Figure 2:
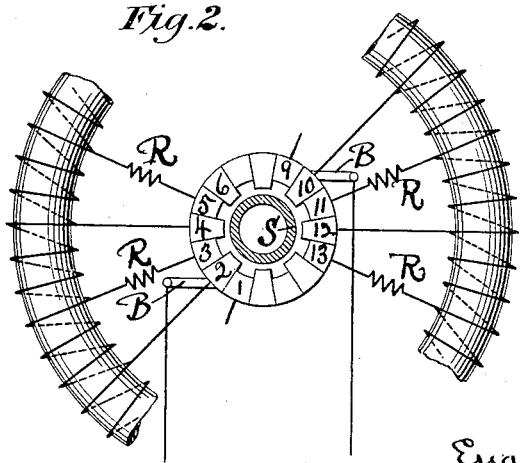

For simplicity I will describe my invention in connection with the type of alternating-current motor shown by me in patents of Great Britain, No. 23,290, dated December 17, 1892, Germany, No. 74,684, dated January 1, 1893, and Switzerland, No. 6,306, dated December 24, 1892, referring particularly to Figure 2 of the German and Swiss patents, for which form of device I have now pending an application in the United States Patent Office, Serial No. 525,362, filed October 9, 1894. In this form of motor alternating current is supplied to the field-magnet. The armature-coils are provided with a commutator and brushes, and the brushes are connected through an adjustable resistance. When the brushes are set at a proper angle, the secondary current induced in the armature and flowing through the brushes and resistances produces poles and effects the initial rotation of the armature. When speed has been attained, the armature-segments are connected directly together by a metallic ring conductor or sleeve, and thereafter the motor runs as an asynchronous or lag motor of the induction type. In another form of motor shown in the patents enumerated, the armature-brushes are connected in series with the field at starting, so that the momentary poles produced in the armature and in the field-magnet act upon each other in the same manner as in the usual constant-current motor and give initial torque. When speed has been attained, the commutator-segments are short-circuited as before and the brushes are cut out of the circuit.

The present invention is especially designed for these two forms of motor, for I have found that by introducing resistance in the commutator connections in a certain manner, I am enabled to cut down the harmful short-circuit sparking current to such an extent that no objectionable results are produced.

Figure 1:
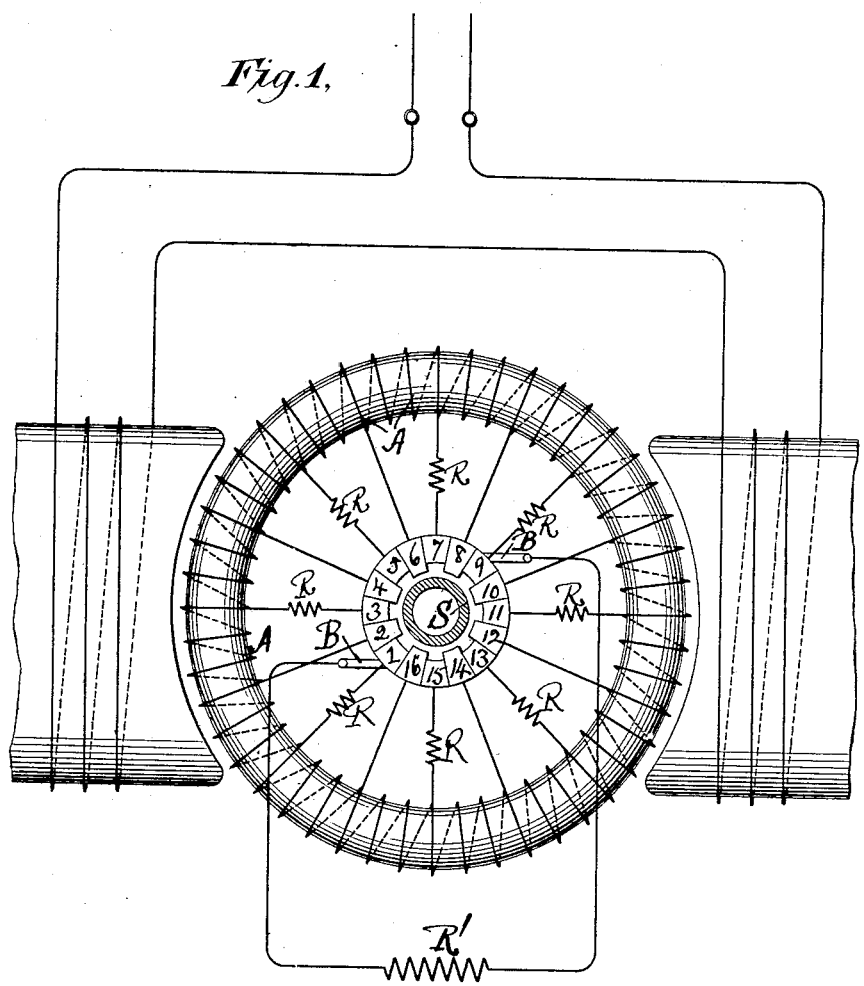

In the accompanying drawings, Fig. 1 illustrates my invention as applied to a motor of the type first described above, and Fig. 2 is a fragmentary view showing the position of the brushes after the armature has turned one segment from the position shown in Fig. 1, and Figs. 3 and 4 are detail views of a short-circuiting device which forms a part of my apparatus.

Throughout the drawings like letters and figures of reference indicate like parts.

The commutator-segments are numbered from 1 to 16, consecutively. Alternate segments corresponding with even numerals are connected directly to the corresponding points of the armature-coils A. The remaining commutator-segments are connected to the corresponding points of the armature coils or windings through the resistances R. The brushes B in passing from one segment to the next, as from segment 1 to segment 2, directly short-circuit one section or coil of the armature-winding, but this short-circuiting must take place in each instance through one of the resistances R, and I make the resistance R sufficiently great to cut down the short-circuited current to such an extent that no harmful result is possible. The width of the brush must be such that it never can extend over and connect three commutator-segments, that is, the width of the brush must be less than the width of one commutator-segment and the two strips of insulation on each side of it. This rule being observed no harmful short-circuiting can take place. The useful current, passing from the brush B to the brush connection and resistance R', or through the external circuit in other forms of machine, is not materially interfered with by the resistances R. At the position shown in Fig. 1 two resistances R, corresponding with the two segments 1 and 9, are both in circuit. When the armature is turned and the segments 2 and 10 come under the brushes, no resistance R is in the circuit, so that half of the time two of the resistances are in the circuit and the other half of the time none are in the circuit. The amount of current wasted in these resistances is in all cases negligible, and in the form of motor shown in the drawings the resistances R merely add to the useful effect of the resistance R', which may be reduced proportionately. In this form of motor the commutator segments and brushes are only used while starting, and this enables me to entirely cut out the resistances R when the machine has attained synchronous speed, so that the least possible resistance may be afforded to the useful induced armature-currents. This is accomplished in the following manner: The evenly-numbered segments of the commutator which have no resistance in their connections to the coils project toward the shaft (or any other direction) beyond the segments having the resistances R. When synchronous speed is approximated, the short-circuiting device or sleeve S, which may be of any desired type, as set forth in my foreign patents referred to, but which I intend only to illustrate diagrammatically, is brought into contact with all these projecting segments, directly short-circuiting them and thereby transforming the armature into a short-circuit induction-armature. The brushes B are then raised from the commutator and the motor runs as an asynchronous or lag induction-motor.

In Figs. 3 and 4 I illustrate one form of short-circuiting device or sleeve S. The device is shown in cross-section in Fig. 3, and in Fig. 4 the details of two of the projecting commutator-plates 10 and 12 are shown with the non-projecting blades 9, 11, and 13 adjacent to them. The short-circuiting sleeve is shown at S. This is provided with the spring-fingers or projections s, which, as clearly seen in Fig. 4, make contact with the projecting ends of the corresponding alternate commutator-segments, as, for instance, 10 and 12. The sleeve is forced axially into and out of contact with the commutator by means of a hand-wheel T, which is shown merely to illustrate one way of accomplishing this. This wheel T turns upon a screw-threaded portion of the commutator support or shaft, and is secured to, though free to turn upon, the sleeve S. After the motor has obtained synchronous speed, the attendant puts his hand upon the smooth rim of the revolving wheel T, and by applying some pressure and consequent friction thereto, causes it to be retarded in its rotation so that the screw-threaded portion of the commutator turns rapidly within the wheel T and draws the wheel and sleeve S, by means of the screw-threading, quickly into contact with the commutator-segments, thereby short-circuiting alternate segments, which, in the drawings, are evenly numbered.

From the foregoing it is clear that by my invention I am enabled to obviate sparking in a motor of the class described without the introduction of any useless resistance, and when the motor has been started and is running as a short-circuit armature-motor, the resistances R are entirely disused. The application of the invention to other forms of motors will be obvious to those skilled in the art, and I therefore will not further describe it.

Having now fully set forth my invention in one of its most preferred forms, and as applied to one of my forms of motor, I claim as my own, and desire to secure by these Letters Patent of the United States, together with all such modifications as may be made by mere skill in the art without departing from the principles involved, and with only the limitations and restrictions as expressed or by law implied, the following:

1. The combination of an armature, coils, commutator, and brushes, with resistances in the commutator connections (whereby the short-circuited current generated when a brush is passing from one segment to another may be reduced) and with means for directly short-circuiting the several armature-coils, substantially as set forth.

2. The combination of an armature, commutator and brushes therefor, with the resistances R introduced in alternate commutator connections, substantially as set forth.

3. In combination with an armature, commutator and brushes, resistances R introduced in alternate commutator connections, and means for short-circuiting such commutator segments or connections as have no resistances R, substantially as set forth.

4. In combination with an armature, a commutator having alternate segments connected to the armature-coils through resistances R and the remaining segments directly connected to the said armature-coils, the last said commutator-segments being provided with contacts or projecting portions and a short-circuiting device for making contact with the said contacts or projecting portions, substantially as set forth.

In testimony whereof I have hereunto set my hand this 4th day of December, A. D. 1894.

ENGELBERT ARNOLD.

In presence of—
  Y. ENGLER,
  GOLDFINGER ARMIN.